(12) United States Patent
Zhang et al.

(10) Patent No.: US 12,513,779 B2
(45) Date of Patent: Dec. 30, 2025

(54) RANDOM ACCESS METHOD, TERMINAL AND NETWORK DEVICE

(71) Applicant: VIVO MOBILE COMMUNICATION CO., LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 678 days.

(21) Appl. No.: 17/143,999

(22) Filed: Jan. 7, 2021

(65) Prior Publication Data
US 2021/0136831 A1    May 6, 2021

Related U.S. Application Data

(63) Continuation of application No. PCT/CN2019/097457, filed on Jul. 24, 2019.

(30) Foreign Application Priority Data

Jul. 26, 2018   (CN) .......................... 201810837903.3

(51) Int. Cl.
*H04W 76/30* (2018.01)
*H04L 5/00* (2006.01)
*H04W 74/0833* (2024.01)
*H04W 74/0836* (2024.01)

(52) U.S. Cl.
CPC ........... *H04W 76/30* (2018.02); *H04L 5/0048* (2013.01); *H04W 74/0833* (2013.01); *H04W 74/0836* (2024.01)

(58) Field of Classification Search
CPC .. H04W 74/0833; H04W 76/30; H04L 5/0048
See application file for complete search history.

(56) References Cited

U.S. PATENT DOCUMENTS 9,674,865 B2 *   6/2017   Pelletier ................ H04W 74/04
9,730,249 B2 *   8/2017   Jha ........................ H04W 76/10
10,693,605 B2 *  6/2020   Islam .................... H04L 5/0048
(Continued)

FOREIGN PATENT DOCUMENTS

CN   102711187 A   10/2012
CN   102932950 A   2/2013
(Continued)

OTHER PUBLICATIONS

KR Office Action in Application No. 10-2021-7006068 dated Feb. 13, 2023.
(Continued)

*Primary Examiner* — Parth Patel
(74) *Attorney, Agent, or Firm* — Price Heneveld LLP

(57) ABSTRACT

The present disclosure provides a random access method, a terminal and a network device. The random access method, performed by a terminal, includes: obtaining configuration information of a target random access; determining a first physical uplink shared channel (PUSCH) resource for transmitting a message 1, according to the configuration information; on the first PUSCH resource, transmitting the message 1 of the target random access.

15 Claims, 4 Drawing Sheets

(56) References Cited

U.S. PATENT DOCUMENTS

| | | | |
|---|---|---|---|
| 11,272,486 B2* | 3/2022 | Lee | H04L 1/0003 |
| 11,297,608 B2* | 4/2022 | Lee | H04B 7/0617 |
| 2013/0322339 A1* | 12/2013 | Ohta | H04L 5/001 |
| | | | 370/328 |
| 2015/0049654 A1 | 2/2015 | Pan et al. | |
| 2015/0181546 A1* | 6/2015 | Freda | H04W 76/14 |
| | | | 370/336 |
| 2015/0263840 A1* | 9/2015 | Rastogi | H04W 76/14 |
| | | | 370/329 |
| 2018/0199358 A1* | 7/2018 | Moosavi | H04W 72/20 |
| 2018/0249508 A1 | 8/2018 | Gao et al. | |
| 2019/0090281 A1* | 3/2019 | Vos | H04W 72/04 |
| 2019/0200363 A1* | 6/2019 | Rajendran | H04W 52/16 |
| 2019/0223157 A1* | 7/2019 | Hwang | H04W 74/0833 |
| 2019/0254078 A1 | 8/2019 | Zhang | |
| 2019/0313348 A1* | 10/2019 | MolavianJazi | H04W 52/50 |
| 2019/0313449 A1* | 10/2019 | Tsai | H04W 72/1268 |
| 2019/0372727 A1* | 12/2019 | Joseph | H04L 27/2613 |
| 2019/0387553 A1* | 12/2019 | Gong | H04W 74/0833 |
| 2019/0394082 A1* | 12/2019 | Cirik | H04W 76/28 |
| 2020/0119778 A1* | 4/2020 | Grant | H04B 7/0617 |
| 2020/0127883 A1* | 4/2020 | Liu | H04L 41/0686 |
| 2020/0214042 A1* | 7/2020 | Nagaraja | H04W 74/02 |
| 2020/0221503 A1* | 7/2020 | Kusashima | H04W 74/0833 |
| 2020/0267770 A1* | 8/2020 | Islam | H04L 1/08 |
| 2020/0314760 A1* | 10/2020 | Ye | H04W 74/0833 |
| 2020/0374920 A1* | 11/2020 | Tie | H04W 72/23 |
| 2020/0374927 A1* | 11/2020 | Yu | H04W 74/006 |
| 2021/0045163 A1* | 2/2021 | Chai | H04W 74/006 |
| 2021/0120481 A1* | 4/2021 | Cheng | H04W 36/0058 |
| 2021/0136831 A1* | 5/2021 | Zhang | H04W 76/30 |
| 2021/0274567 A1* | 9/2021 | Takeda | H04W 74/0836 |
| 2021/0274568 A1* | 9/2021 | Sengupta | H04W 76/11 |
| 2022/0007258 A1* | 1/2022 | Liou | H04B 7/0408 |
| 2022/0069954 A1* | 3/2022 | Lei | H04L 1/0061 |
| 2022/0279571 A1* | 9/2022 | Takeda | H04W 74/0836 |
| 2022/0312396 A1* | 9/2022 | Pelletier | H04W 74/0808 |
| 2023/0066772 A1* | 3/2023 | Myung | H04B 7/0695 |
| 2024/0089931 A1* | 3/2024 | Pan | H04W 16/28 |

FOREIGN PATENT DOCUMENTS

| | | | | | |
|---|---|---|---|---|---|
| CN | 106470468 A | | 3/2017 | | |
| CN | 107889244 A | | 4/2018 | | |
| CN | 112602368 B | * | 8/2024 | ........ | H04W 74/0836 |
| EP | 3 101 984 A1 | | 7/2016 | | |
| EP | 3 691 394 A1 | | 8/2020 | | |
| KR | 20140136055 A | | 11/2014 | | |
| WO | 2013013539 A1 | | 1/2013 | | |
| WO | 2018/064372 A1 | | 4/2018 | | |

OTHER PUBLICATIONS

CN Office Action in Application No. 201810837903.3 dated Nov. 22, 2021.
EP Search Report in Application No. 19840767.8 dated Sep. 10, 2021.
"NR two-step random access procedure" 3GPP TSG-RAN WG1 NR adhoc, R1-1700300, Ericsson, Jan. 16, 2017.
"Summary of 7.2.1.1 Channel Structure for Two-step RACH", 3GPP TSG WG1 #96, R1-1903435, ZTE, Feb. 25, 2019.
"Data transmission in Inactive" 3GPP TSG-RAN WG2 Meeting #96, R2-167706, Nokia, Alcatel-Lucent Shanghai Bell, Nov. 14, 2016.
"Considerations on NR RACH procedures" 3GPP TSG-RAN WG2 Meeting #96, R2-168013, Nokia Alcatel-Lucent Shanghai Bell, Nov. 14, 2016.
'Baseline handover procedure for inter gNB handover NR' 3GPP TSG-RAN WG2 Adhoc#2 on NR, Huawei, HiSilicon, R2-1706705, Jun. 27, 2017.
"Consideration on the RACH procedure" 3GPP TSG-RAN WG2 Meeting #99, ZTE, R2-1708143, Aug. 21, 2017.
"RACH initialization and resource selection for 2-step RACH" 3GPP TSG-RAN WG2 Meeting #106, R2-1905601, OPPO, May 13, 2019.
Written Opinion and International Search Report in Application No. PCT/CN2019/097457 dated Feb. 4, 2021.

* cited by examiner

RANDOM ACCESS METHOD, TERMINAL AND NETWORK DEVICE

CROSS-REFERENCE TO RELATED APPLICATION

This application is a continuation application of International Application No. PCT/CN2019/097457 filed on Jul. 24, 2019, which claims the priority of Chinese Application No. 201810837903.3, filed on Jul. 26, 2018, which is incorporated herein by reference in their entireties.

TECHNICAL FIELD

The present disclosure relates to the field of communications technology, and in particular to a random access method, a terminal and a network device.

BACKGROUND

New Radio (New Radio, NR) will introduce a simplified two-step contention random access procedure to reduce the delay of the contention random access. A specific process is shown in FIG. 1, including:

Message 0 (Msg0): the network side configures for a user equipment (User Equipment, UE, also called a terminal), configuration information required for a simplified two-step random access, such as a transmission resource of a message 1 (Msg1);

Message 1 (Msg1): the terminal selects a random access resource and uses the random access resource to transmit a selected random access signal (for example, a preamble (preamble)) to the base station; meanwhile, the Msg1 carries a UE identity, and through this identity, the network side can determine which UE transmits the random access request; in addition, Msg1 may further carry user plane data, which is suitable for UE in inactive state for small data transmission, thereby reducing signaling overhead during state transition of the UE.

Message 2 (Msg2): the network side transmits a random access response to the UE; the random access response should carry the UE identity to indicate whether the UE successfully contends for access. If the contention access is successful, the random access response may further carry information such as timing advance and uplink grant.

The simplified two-step contention random access method can reduce the delay of the four-step contention random access, and is suitable for UE in inactive (active) state for small data transmission. However, there is no solution for the transmission resource required for Msg1 in the simplified two-step contention random access.

SUMMARY

Embodiments of the present disclosure provide a random access method, a terminal and a network device, to solve the problem in the related art that there is no definite solution for the transmission resource required for Msg1 in the simplified two-step contention random access, which results in incomplete network communication procedures and inability to guarantee reliability of network communication.

In order to solve the above technical problems, technical solutions of the present disclosure are as follow.

According to a first aspect, one embodiment of the present disclosure provides a random access method, performed by a terminal, including:

obtaining configuration information of a target random access;

determining a first physical uplink shared channel (PUSCH) resource for transmitting a message 1, according to the configuration information;

on the first PUSCH resource, transmitting the message 1 of the target random access.

According to a second aspect, one embodiment of the present disclosure provides a random access method, performed by a network device, including:

transmitting configuration information of a target random access to a terminal;

receiving a message 1 of the target random access fed back by the terminal;

wherein the message 1 is transmitted on a first PUSCH resource which is determined by the terminal for transmitting the message 1 according to the configuration information.

According to a third aspect, one embodiment of the present disclosure provides a terminal, including:

an obtaining module configured to obtain configuration information of a target random access;

a determining module configured to determine, according to the configuration information, a first physical uplink shared channel (PUSCH) resource for transmitting a message 1;

a first transmission module configured to transmit the message 1 of the target random access on the first PUSCH resource.

According to a fourth aspect, one embodiment of the present disclosure provides a terminal, including: a memory, a processor, and a computer program stored in the memory and executable on the processor; wherein the computer program is executed by the processor to implement steps of the foregoing random access method.

According to a fifth aspect, one embodiment of the present disclosure provides a network device, including:

a second transmission module configured to transmit configuration information of a target random access to a terminal;

a receiving module configured to receive a message 1 of the target random access fed back by the terminal;

wherein the message 1 is transmitted on a first PUSCH resource which is determined by the terminal for transmitting the message 1 according to the configuration information.

According to a sixth aspect, one embodiment of the present disclosure provides a network device, including: a memory, a processor, and a computer program stored in the memory and executable on the processor; wherein the computer program is executed by the processor to implement steps of the foregoing random access method.

According to a seventh aspect, one embodiment of the present disclosure provides a computer readable storage medium, including: a computer program stored thereon; wherein the computer program is executed by a processor to implement steps of the foregoing random access method.

The beneficial effects of the present disclosure are as follow.

In the foregoing solution, the first PUSCH resource for transmitting the message 1 in the simplified two-step contention random access is determined according to the configuration information of the simplified two-step contention random access, and transmission of the message 1 is realized, thereby improving network communication procedures and guarantying reliability of network communication.

DETAILED DESCRIPTION

In order to make the objectives, technical solutions and advantages of the present disclosure more clear, the present disclosure will be described hereinafter in detail with reference to the drawings and embodiments.

Figure 1:
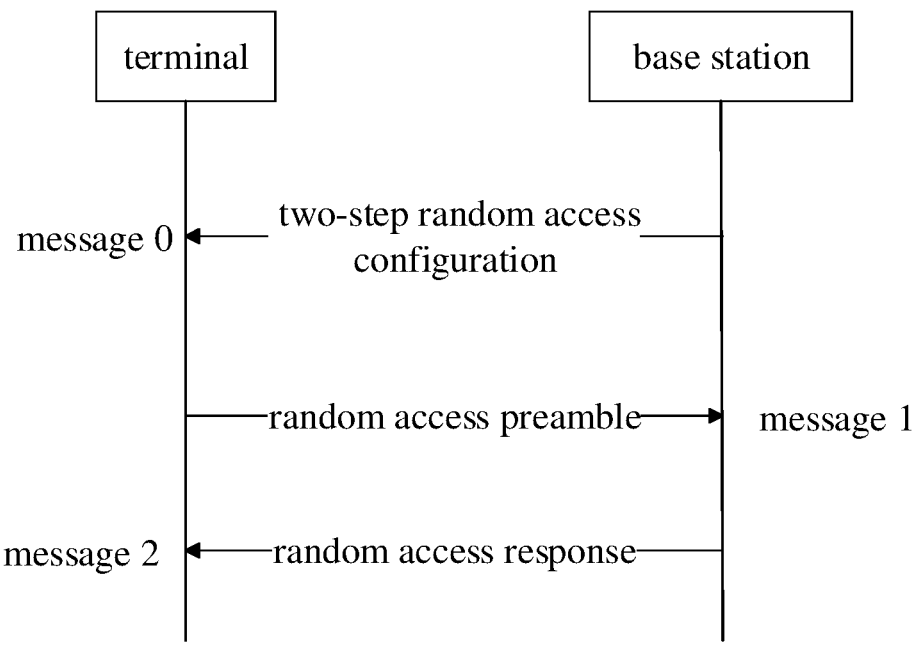
FIG. 1 is a schematic flowchart of a simplified two-step contention random access.
Figure 2:
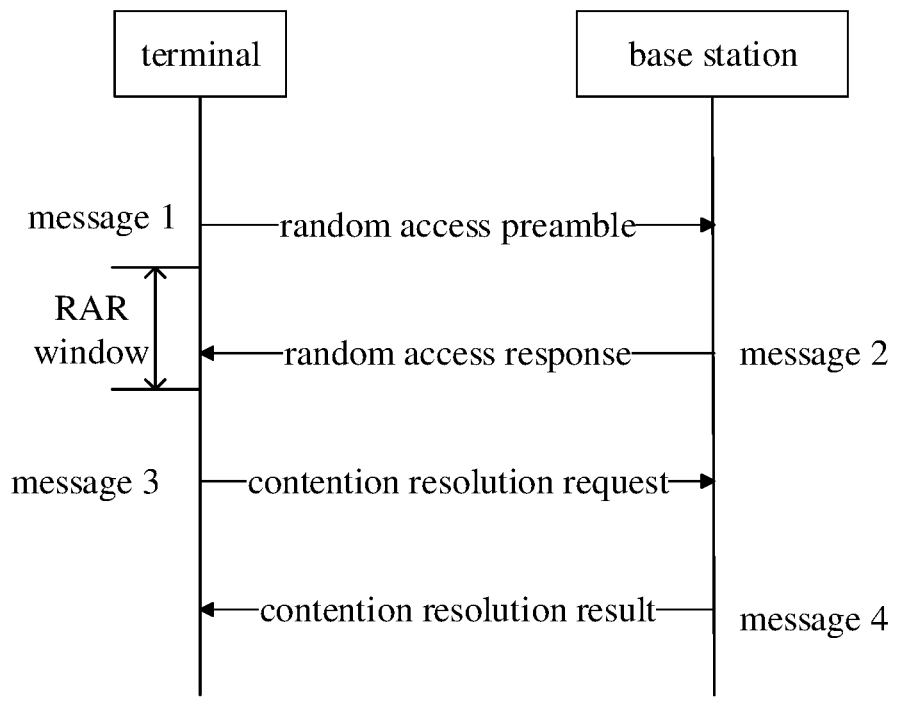
FIG. 2 is a schematic flowchart of a contention random access.

In the description of the embodiments of the present disclosure, some concepts used in the following description are first explained The random access procedure is mainly divided into: non-contention random access and contention random access. The contention random access procedure is shown in FIG. 2 and mainly divided into following four steps.

Message 1 (Msg1): a terminal selects a random access resource and uses the random access resource to transmit a selected random access signal (for example, a preamble) to a base station. After transmitting the Msg1, according to transmission time and frequency position of Msg1, the terminal calculates identity information (i.e., Random Access Radio Network Temporary Identity (RA-RNTI)) of Msg2 scheduled on the network side. After transmitting the Msg1, the terminal monitors a downlink channel in a fixed window (i.e., Random Access Response window (RAR window) to obtain feedback information Msg2 from the network side.

Message 2 (Msg2): the base station receives the Msg1, calculates timing advance (TA), and transmits a random access response to the terminal. The random access response may include: Msg1 RAPID (i.e., identity information); timing advance command (i.e., uplink timing advance information); UL grant (i.e., uplink transmission grant information); backoff indicator (i.e., back-off information); temporary C-RNTI (i.e., temporary terminal identity information). If the terminal fails to receive random access response (RAR) or does not detect the RAPID corresponding to Msg1 transmitted by the terminal itself from the RAR, the terminal determines a next moment for transmitting random access according to the backoff information indicated in the RAR (for example, contained in the RAR).

Message 3 (Msg3): the terminal transmits uplink transmission on a UL grant specified by the Msg2. Content of the uplink transmission of Msg3 is different for different random access reasons. For example, for initial access, Msg3 transmits radio resource control (RRC) connection establishment request. After transmitting Msg3, the terminal will start a contention resolution timer. If Msg4 has not been successfully received before the contention resolution timer expires, the UE considers that reception of Msg4 is unsuccessful.

Message 4 (Msg4): according to Msg4 which is a contention resolution message, the terminal can determine whether the random access is successful.

In NR, cells often operate in high frequency bands, and loss of signals during space transmission is relatively large. If the whole cell is covered by a single beam, the base station is required to support a high transmit power. In order to solve this problem, for NR cells, one cell may be covered by multiple beams, and the multiple beams operate in a time division manner. For example, one sector cell is covered by eight beams. The eight beams are transmitted in a time division manner, and the cell transmits only one beam at each moment.

The UE identifies different beams according to reference symbols. There are two types of reference symbols: synchronization signal block (SSB) and channel state information-reference signal (CSI-RS). The UE may determine a reference symbol to be monitored according to configurations of the network, and may determine, according to a received reference symbol, which one/several beams covers a position where the UE is located.

The simplified two-step contention random access method can reduce the delay of the four-step contention random access, and may be suitable for UE in active state for small data transmission. However, there is no solution for the transmission resource required for Msg1 in the simplified two-step contention random access.

In view of the problem in the related art that there is no solution for the transmission resource required for Msg1 in the simplified two-step contention random access, which results in incomplete network communication procedures and inability to guarantee reliability of network communication, the present disclosure provides a random access method, a terminal and a network device.

Figure 3:
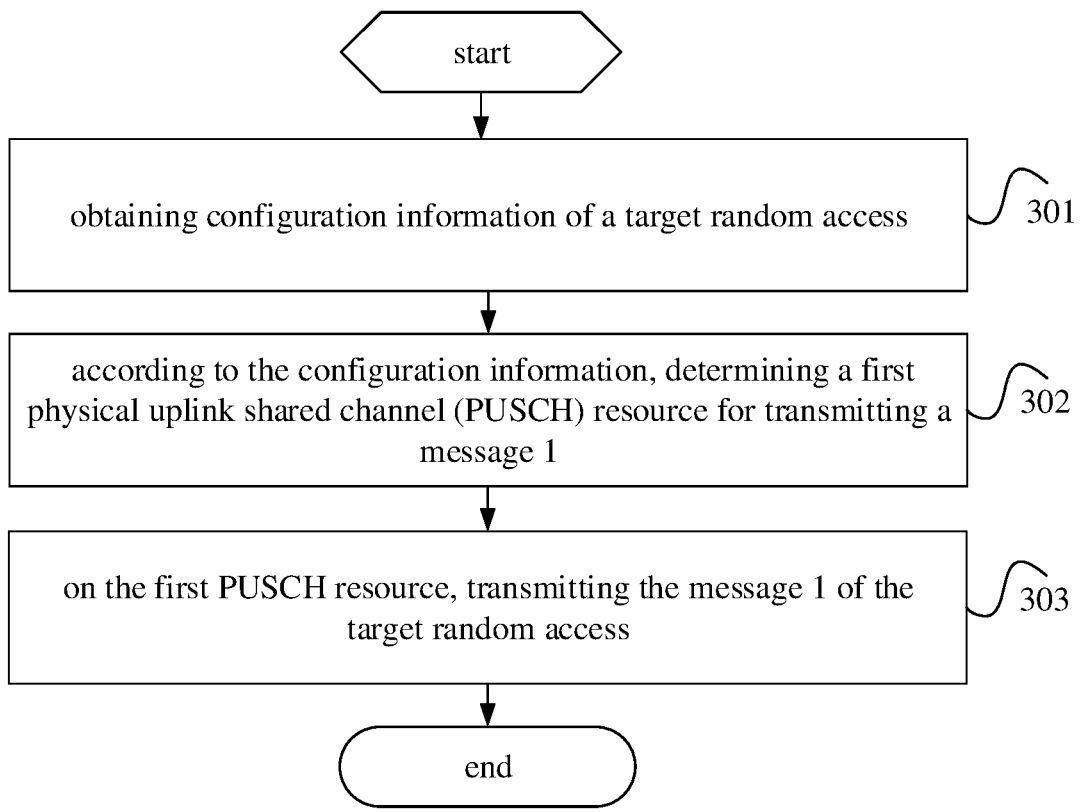
FIG. 3 is a schematic flowchart of a random access performed by a terminal side according to an embodiment of the present disclosure.

As shown in FIG. 3, one embodiment of the present disclosure provides a random access method, performed by a terminal, including:

Step 301: obtaining configuration information of a target random access.

It should be noted that the target random access refers to a simplified two-step contention random access.

Step 302: according to the configuration information, determining a first physical uplink shared channel (PUSCH) resource for transmitting a message 1.

Step 303: on the first PUSCH resource, transmitting the message 1 of the target random access.

According to the configuration information of the simplified two-step contention random access, the first PUSCH resource for transmitting the message 1 is determined. The first PUSCH resource is mainly used to transmit user plane data and then transmit the message 1 of the simplified two-step contention random access. In this way, it defines a way of using the first PUSCH resource to transmit the message 1 of the simplified two-step contention random access.

Further, it should be noted that the configuration information includes at least one of the following information.

A1: at least one reference signal monitored by the terminal.

It should be noted that the at least one reference signal includes: at least one synchronization signal block (SSB) and/or at least one channel state information reference signal (CSI-RS).

The at least one reference signal in the A1 information refers to at least one reference signal, which is configured by the network device for the terminal and which the terminal needs to monitor.

A2. Association relationship between reference signals and PUSCH resources.

It should be noted that the network device may configure one PUSCH resource for the terminal, and may also configure multiple PUSCH resources. Specifically, the PUSCH resource includes: a grant-free resource and/or a pre-configured resource for a target random access. It should be noted that the pre-configured resource refers to a resource reserved by the network device for the simplified two-step contention random access.

It should be noted that the association relationship includes at least one of the following information.

A21: there is a one-to-one relationship between the reference signal and the PUSCH resource.

That is, one reference signal is associated with only one PUSCH resource. For example, when reference signals monitored by the terminal include: SSB1 and CSI-RS0, SSB1 corresponds to PUSCH resource 0, and CSI-RS0 corresponds to PUSCH resource 1.

A22. One PUSCH resource corresponds to at least one reference signal.

It should be noted that, at this point, the association relationship between PUSCH resources and reference signals is a one-to-many relationship, that is, one PUSCH resource corresponds to multiple reference signals. For example, when reference signals monitored by the terminal include SSB2 and SSB3, the SSB2 corresponds to a PUSCH resource 2, and the SSB3 also corresponds to the PUSCH resource 2.

A23. One reference signal corresponds to at least one PUSCH resource.

It should be noted that, at this point, the association relationship between reference signals and PUSCH resources is a one-to-many relationship, that is, one reference signal corresponds to multiple PUSCH resources. For example, when reference signals monitored by the terminal include CSI-RS1 and CSI-RS2, the CSI-RS1 corresponds to a PUSCH resource 3 and a PUSCH resource 4, and the CSI-RS2 corresponds to a PUSCH resource 5 and a PUSCH resource 6.

It should be noted here that, in the configuration information, any one of the foregoing association modes may be adopted, or some of them may be selected, or the foregoing three association modes may be selected simultaneously. For example, when reference signals monitored by the terminal include SSB4, SSB5, SSB6 and CSI-RS3, the SSB4 corresponds to a PUSCH resource 7, the SSB5 and the SSB6 correspond to a PUSCH resource 8, and the CSI-RS3 corresponds to a PUSCH resource 9 and a PUSCH resource 10.

A3. A performance indicator according to which the terminal selects a first reference signal from the at least one reference signal.

It should be noted that the performance indicator includes one of the following information:

Reference signal receiving power (RSRP), reference signal receiving quality (RSRQ), and Signal to Interference and Noise Ratio (SINR).

That is, in one configuration, the network device instructs the terminal to use only one performance indicator to select the first reference signal, and the performance indicator is any one of RSRP, RSRQ, and SINR.

A4. A preset threshold value for a performance indicator, according to which the terminal selects a first reference signal from the at least one reference signal.

It should be noted that the preset threshold value refers to a threshold standard on which the performance indicator is based when selecting the first reference signal. For example, if RSRP is taken as the performance indicator for selecting the first reference signal, when there is a reference signal with an actual measurement value of the performance indicator being greater than or equal to the preset threshold value, only the reference signal with an actual measurement value of the performance indicator being greater than or equal to the preset threshold value is selected as the first reference signal.

Further, it should be noted that the step 101 may be implemented in at least one of the following ways:

B1. receiving configuration information of a target random access transmitted by the network device through a system broadcast message;

B2. receiving configuration information of a target random access transmitted by the network device through a radio resource control (RRC) release message.

For example, in one configuration, the network device may selectively transmit all information contained in the configuration information through a system broadcast message, or transmit all information contained in the configuration information through an RRC release message. The network device may also selectively transmit one part of the configuration information through a system broadcast message, and transmit other part of the configuration information through an RRC release message.

Further, it should be noted that one specific implementation of the step 102 includes: determining a first reference signal; determining one PUSCH resource from PUSCH resources associated with the first reference signal, as the first PUSCH resource for transmitting the message 1.

This implementation process is as follows: the terminal first determines which reference signal is selected to determine the PUSCH resource; after the reference signal is determined, it is only necessary to determine one PUSCH resource for transmitting the message 1 from PUSCH resources associated with the reference signal.

Specifically, the manner of determining the first reference signal includes:

C1. when there is a reference signal with a performance indicator being greater than or equal to the preset threshold value, determining one reference signal from at least one reference signal with the performance indicator being greater than or equal to the preset threshold value, as the first reference signal.

In this case, it should be noted that when there is only one reference signal with a performance indicator being greater than or equal to the preset threshold value, it is only necessary to determine the reference signal as the first reference signal. When there are at least two reference signals with performance indicators being greater than or equal to the preset threshold value, one of the at least two reference signals with performance indicators being greater than or equal to the preset threshold value, is determined as the first reference signal. At this point, the rule for selecting the first reference signal may include: randomly selecting one from the at least two reference signals with performance indicators being greater than or equal to the preset threshold value, as the first reference signal; or, selecting one, which meets a first preset condition, from the at least two reference signals with performance indicators being greater than or equal to the preset threshold value, as the first reference signal.

Specifically, the first preset condition includes at least one of the following conditions:

time domain is less than or equal to a first preset threshold value;

frequency domain is less than or equal to a second preset threshold value.

It should be noted that the time domain here may be time domain corresponding to a random opportunity (RO) associated with the reference signal, and the frequency domain here refers to frequency domain corresponding to the RO associated with the reference signal.

According to the first preset rule, an earliest available reference signal is selected. That is, a reference signal corresponding to an earliest RO in the time domain and/or an earliest RO in the frequency domain is taken as the earliest available reference signal.

C2. When there is no reference signal with a performance indicator being greater than or equal to the preset threshold value, determining one reference signal from reference signals configured by the network device for the terminal, as the first reference signal.

It should be noted that, in this case, the terminal may randomly determine one of the reference signals configured by the network device for the terminal, as the first reference signal; or, the terminal may select one, which meets a first preset condition, from the reference signals configured by the network device for the terminal, as the first reference signal. It should be noted that the first preset condition has the same meaning as the foregoing first preset condition, that is, in this case, the terminal selects an earliest available reference signal.

After the first reference signal is determined, the first PUSCH resource needs to be determined according to the first reference signal. Specifically, the determining one PUSCH resource from PUSCH resources associated with the first reference signal, as the first PUSCH resource for transmitting the message 1, includes:

D1. When the first reference signal is associated with one PUSCH resource, determining the PUSCH resource corresponding to the first reference signal as the first PUSCH resource.

It should be noted that when the first reference signal is associated with only one PUSCH resource, since there is no choice, the PUSCH resource is taken as the first PUSCH resource.

D2. When the first reference signal is associated with at least two PUSCH resources, selecting a target PUSCH resource from the at least two PUSCH resources associated with the first reference signal, as the first PUSCH resource.

It should be noted that the target PUSCH resource is a random one of the at least two PUSCH resources associated with the first reference signal, or the target PUSCH resource is one PUSCH resource, which meets a second preset condition, of the at least two PUSCH resources associated with the first reference signal. That is, when the first reference signal is associated with multiple PUSCH resources, the terminal may randomly select one from the multiple PUSCH resources as the first PUSCH resource, or may select one PUSCH resource, which meets a second preset condition, from the multiple PUSCH resources as the first PUSCH resource.

Specifically, the second preset condition includes: time domain is less than or equal to a third preset threshold value. It should be noted that the time domain here refers to time domain corresponding to the PUSCH resource, that is, in this case, the terminal selects an earliest available PUSCH resource as the first PUSCH resource.

It should be noted that the embodiments of the present disclosure may be applied to NR and subsequent evolved communication systems.

In the embodiments of the present disclosure, the terminal can select a PUSCH resource required for transmitting a message 1 of the simplified two-step contention random access, based on the association relationship between SSB (and/or CSI-RS) and PUSCH resources configured on the network side as well as ways of selecting SSB based on such as RSRP, thereby reducing access delay of the terminal as compared with four-step contention random access. Meanwhile, the user plane data may be carried on the PUSCH resource, thereby reducing signaling overhead during state transition of the UE.

Figure 4:
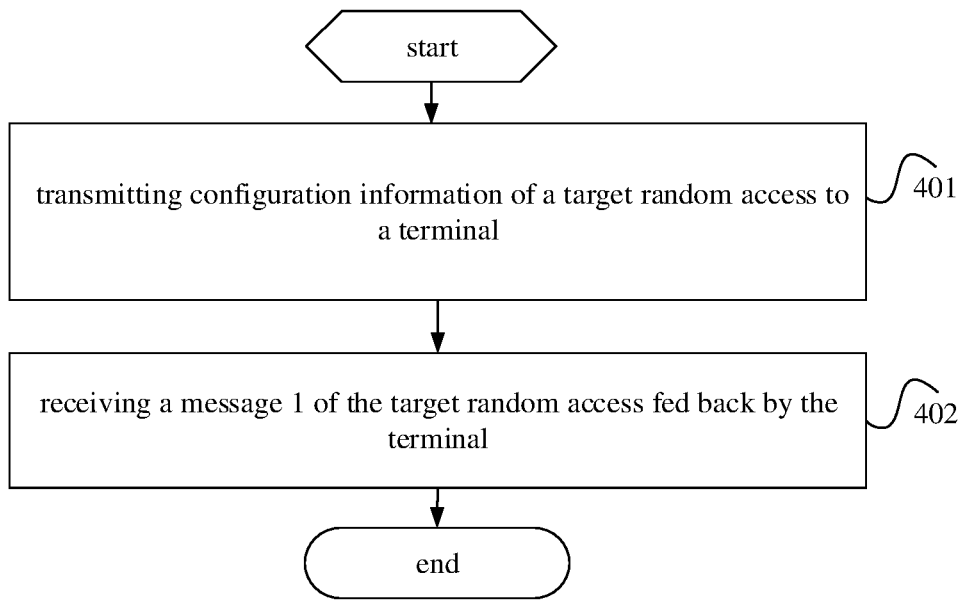
FIG. 4 is a schematic flowchart of a random access performed by a network device side according to an embodiment of the present disclosure.

Specifically, as shown in FIG. 4, FIG. 4 is a schematic flowchart of a random access performed by a network device side according to an embodiment of the present disclosure. The random access method performed by the network device includes:

Step 401: transmitting configuration information of a target random access to a terminal;

Step 402: receiving a message 1 of the target random access fed back by the terminal.

The message 1 is transmitted on a first PUSCH resource which is determined by the terminal for transmitting the message 1 according to the configuration information.

Specifically, the configuration information includes at least one of the following information:

at least one reference signal monitored by the terminal;

association relationship between reference signals and PUSCH resources;

a performance indicator according to which the terminal selects a first reference signal from the at least one reference signal;

a preset threshold value for a performance indicator, according to which the terminal selects a first reference signal from the at least one reference signal.

Specifically, the association relationship includes at least one of the following information:

there is a one-to-one relationship between the reference signal and the PUSCH resource;

one PUSCH resource corresponds to at least one reference signal;

one reference signal corresponds to at least one PUSCH resource.

Specifically, the at least one reference signal includes at least one synchronization signal block (SSB) and/or at least one channel state information reference signal (CSI-RS).

Specifically, the performance indicator includes one of the following information:

Reference signal receiving power (RSRP), reference signal receiving quality (RSRQ), and signal-to-noise ratio (SINR).

Specifically, the PUSCH resource includes: a grant-free resource and/or a pre-configured resource for a target random access.

Further, the step 401 includes at least one of the following ways:

transmitting configuration information of a target random access to the terminal through a system broadcast message;

transmitting configuration information of a target random access to the terminal through a radio resource control (RRC) release message.

It should be noted that all the descriptions of the network device in the foregoing embodiments are applicable to the embodiment of the random access method performed by the network device, and the same technical effect can also be achieved.

Figure 5:
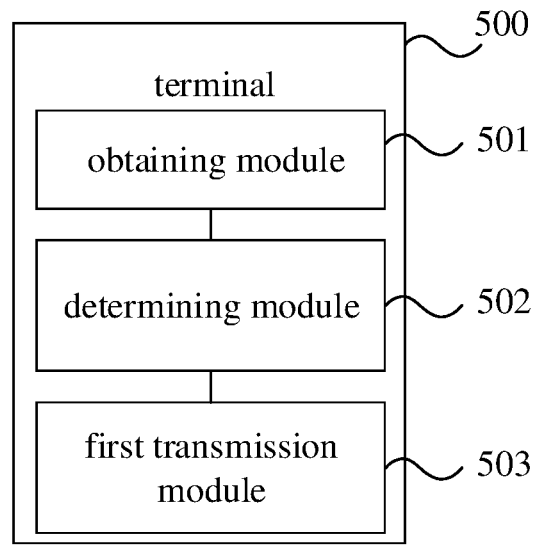
FIG. 5 is a schematic diagram showing modules of a terminal according to an embodiment of the present disclosure.

As shown in FIG. 5, one embodiment of the present disclosure provides a terminal 500, including:
an obtaining module 501 configured to obtain configuration information of a target random access;
a determining module 502 configured to determine, according to the configuration information, a first physical uplink shared channel (PUSCH) resource for transmitting a message 1;
a first transmission module 503 configured to transmit the message 1 of the target random access on the first PUSCH resource.

Specifically, the configuration information includes at least one of the following information:
at least one reference signal monitored by the terminal;
association relationship between reference signals and PUSCH resources;
a performance indicator according to which the terminal selects a first reference signal from the at least one reference signal;
a preset threshold value for a performance indicator, according to which the terminal selects a first reference signal from the at least one reference signal.

Specifically, the association relationship includes at least one of the following information:
there is a one-to-one relationship between the reference signal and the PUSCH resource;
one PUSCH resource corresponds to at least one reference signal;
one reference signal corresponds to at least one PUSCH resource.

Specifically, the at least one reference signal includes at least one synchronization signal block (SSB) and/or at least one channel state information reference signal (CSI-RS).

Specifically, the performance indicator includes one of the following information:
Reference signal receiving power (RSRP), reference signal receiving quality (RSRQ), and signal-to-noise ratio (SINR).

Specifically, the PUSCH resource includes: a grant-free resource and/or a pre-configured resource for a target random access.

Further, the obtaining module 501 performs at least one of the following:
receiving configuration information of a target random access transmitted by the network device through a system broadcast message;
receiving configuration information of a target random access transmitted by the network device through a radio resource control (RRC) release message.

Further, the determining module 502 includes:
a first determining submodule configured to determine a first reference signal;
a second determining submodule configured to determine one PUSCH resource from PUSCH resources associated with the first reference signal, as the first PUSCH resource for transmitting the message 1.

Further, the first determining submodule includes:
a first determining unit configured to, when there is a reference signal with a performance indicator being greater than or equal to the preset threshold value, determine one reference signal from at least one reference signal with the performance indicator being greater than or equal to the preset threshold value, as the first reference signal; or,
a second determining unit configured to, when there is no reference signal with a performance indicator being greater than or equal to the preset threshold value, determine one reference signal from reference signals configured by the network device for the terminal, as the first reference signal.

Specifically, the first determining unit is configured to, when there are at least two reference signals with performance indicators being greater than or equal to the preset threshold value, determine one of the at least two reference signals with performance indicators being greater than or equal to the preset threshold value, as the first reference signal.

The first reference signal may be one randomly selected from the at least two reference signals; or, the first reference signal may be one, which meets a first preset condition, from the at least two reference signals.

Specifically, the second determining unit is configured to,
randomly select one of the reference signals configured by the network device for the terminal, as the first reference signal; or,
select one, which meets a first preset condition, from the reference signals configured by the network device for the terminal, as the first reference signal.

Further, the first preset condition includes at least one of the following conditions:
time domain is less than or equal to a first preset threshold value;
frequency domain is less than or equal to a second preset threshold value.

Specifically, the second determining submodule is configured to,
when the first reference signal is associated with one PUSCH resource, determine the PUSCH resource corresponding to the first reference signal as the first PUSCH resource; or,
when the first reference signal is associated with at least two PUSCH resources, select a target PUSCH resource from the at least two PUSCH resources associated with the first reference signal, as the first PUSCH resource.

Further, the target PUSCH resource is a random one of the at least two PUSCH resources associated with the first reference signal, or the target PUSCH resource is one PUSCH resource, which meets a second preset condition, of the at least two PUSCH resources associated with the first reference signal.

Further, the second preset condition includes: time domain is less than or equal to a third preset threshold value.

It should be noted that the terminal embodiment is a terminal corresponding to the foregoing random access method applied to the terminal side, and all implementation modes of the foregoing embodiments are applicable to this terminal embodiment and can also achieve the same technical effects.

Figure 6:
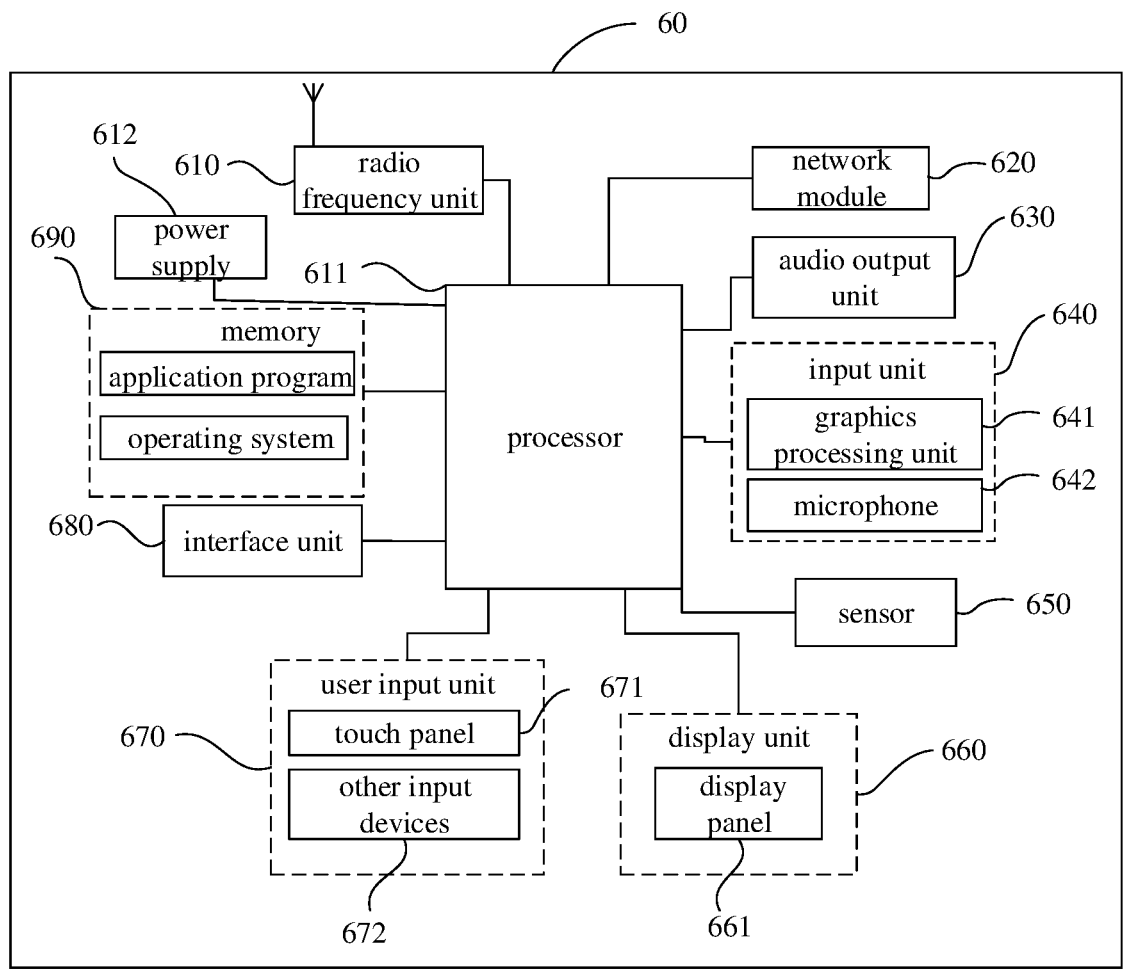
FIG. 6 is a structural block diagram of a terminal according to an embodiment of the present disclosure.

FIG. 6 is a schematic diagram of a hardware structure of a terminal according to an embodiment of the present disclosure.

The terminal 60 includes, but is not limited to, a radio frequency unit 610, a network module 620, an audio output unit 630, an input unit 640, a sensor 650, a display unit 660, a user input unit 670, an interface unit 680, a memory 690, a processor 611, and a power supply 612. It will be appreciated by those skilled in the art that structures of the terminal shown in FIG. 6 do not constitute a limitation of the terminal, which may include more or fewer components than illustrated, or have some components combined, or different component arrangements. In embodiments of the present disclosure, the terminal includes, but is not limited to, a mobile phone, a tablet computer, a notebook computer, a palmtop computer, an in-vehicle terminal, a wearable device, a pedometer, and the like.

The processor 611 is configured to obtain configuration information of a target random access; according to the configuration information, determine a first physical uplink shared channel (PUSCH) resource for transmitting message 1; on the first PUSCH resource, transmit a message 1 of the target random access.

The terminal of the embodiment of the present disclosure determines the first PUSCH resource for transmitting the message 1 in the simplified two-step contention random access according to the configuration information of the simplified two-step contention random access, and realizes transmission of the message 1, thereby improving network communication procedures and guarantying reliability of network communication.

It should be understood that in some embodiments of the present disclosure, the radio frequency unit 610 may be used to receive and transmit signals during receiving and transmitting information or a call. Specifically, the radio frequency unit 610 receives downlink data from a network device and then transmits the downlink data to the processor 611 for processing. Uplink data is transmitted to the network device. Generally, the radio frequency unit 610 includes, but is not limited to, an antenna, at least one amplifier, a transceiver, a coupler, a low noise amplifier, a duplexer, and the like. In addition, the radio frequency unit 610 may also communicate with the network and other devices through a wireless communication system.

The terminal provides wireless broadband internet access to the user through the network module 620, such as assisting the user in receiving and transmitting email, browsing web pages, and accessing streaming media.

The audio output unit 630 may convert the audio data received by the radio frequency unit 610 or the network module 620 or stored in the memory 690 into an audio signal and output as sound. Moreover, the audio output unit 630 may also provide audio output (e.g., call signal reception sound, message reception sound, etc.) related to a specific function performed by the terminal 60. The audio output unit 630 includes a speaker, a buzzer, a receiver, and the like.

The input unit 640 is used for receiving an audio or video signal. The input unit 640 may include a graphics processing unit (Graphics Processing Unit, GPU) 641 and a microphone 642. The GPU 641 processes image data of static pictures or videos obtained by an image capturing apparatus (such as a camera) in a video capturing mode or an image capturing mode. The processed image frame may be displayed on the display unit 660. The image frames processed by the graphics processor 641 may be stored in the memory 690 (or other storage medium) or transmitted via the radio frequency unit 610 or the network module 620. The microphone 642 can receive sound and can process such sound into audio data. The processed audio data may be converted into a format output that may be transmitted to the mobile communication base station via the radio frequency unit 610 in the case of a telephone talk mode.

The terminal 60 further includes at least one sensor 650, such as a light sensor, a motion sensor, and other sensors. Specifically, the light sensor includes an ambient light sensor and a proximity sensor. The ambient light sensor can adjust brightness of a display panel 661 according to the brightness of the ambient light. The proximity sensor can turn off the display panel 661 and/or backlight when the terminal 60 moves to the ear. As one of the motion sensors, an accelerometer sensor can detect the magnitude of the acceleration in each direction (generally three axes), can detect the magnitude and direction of the gravity when stationary, and can be used to identify the attitude of the terminal (such as horizontal or vertical screen switching, related games, magnetometer attitude calibration), vibration identification related functions (such as pedometer, knocking), and the like. The sensor 650 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 660 is used to display information input by or provided to the user. The display unit 660 may include a display panel 661, which may be configured in the form of a liquid crystal display (Liquid Crystal Display, LCD), an organic light-emitting diode (Organic Light-Emitting Diode, OLED), or the like.

The user input unit 670 may be used to receive the input number or character information, and to generate a key signal input related to the user setting and the function control of the terminal. Specifically, the user input unit 670 includes a touch panel 671 and other input devices 672. The touch panel 671, also referred to as a touch screen, may collect touch operations on or near the touch panel (e.g., operations on or near the touch panel 671 using any suitable object or accessory, such as a finger, stylus, or the like). The touch panel 671 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 611, receives commands from the processor 611 and execute them. In addition, the touch panel 671 may be implemented in various types such as a resistive type, a capacitive type, an infrared ray, and a surface acoustic wave. In addition to the touch panel 671, the user input unit 670 may further include other input devices 672. Specifically, other input devices 672 may include, but are not limited to, a physical keyboard, a function key (such as a volume control key, an on-off key), a trackball, a mouse, and a joystick, which will not be elaborated herein.

Further, the touch panel 671 may be overlaid on the display panel 661. When the touch panel 671 detects a touch operation on or near the touch panel, the touch panel 671 transmits it to the processor 611 to determine a type of a touch event. Then, the processor 611 provides a corresponding visual output on the display panel 661 according to the type of the touch event. Although in FIG. 6, the touch panel 671 and the display panel 661 are implemented as two separate components to implement the input and output functions of the terminal, in some embodiments, the touch panel 671 and the display panel 661 may be integrated to implement the input and output functions of the terminal, which are not specifically limited herein.

The interface unit 680 is an interface through which an external device is connected to the terminal 60. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 680 may be used to receive input (e.g., data information, power, etc.) from the external device and transmit the received input to one or more elements within the terminal 60 or may be used to transmit data between the terminal 60 and the external device.

The memory 690 may be used to store software programs and various data. The memory 690 may mainly include a program storage area and a data storage area. The program storage area may store an operating system, an application program (such as a sound play function, an image play function) required by at least one function, and the like. The data storage area may store data (such as audio data, a phone book) created according to use of the mobile phone. In addition, the memory 690 may include high speed random access memory, and may also include non-volatile memory, such as at least one magnetic disk storage device, flash memory device, or other volatile solid state storage device.

The processor 611 is a control center of the terminal, connects various parts of the entire terminal by various interfaces and lines, executes various functions of the terminal and processes data by running or executing software programs and/or modules stored in the memory 690 and invoking data stored in the memory 690, thereby performing overall monitoring of the terminal. The processor 611 may include one or more processing units. Optionally, the processor 611 may integrate an application processor and a modem processor. The application processor primarily processes the operating system, the user interface and the application program. The modem processor primarily processes wireless communications. It will be appreciated that the modem processor may also not be integrated into the processor 611.

The terminal 60 may further include a power source 612 (such as a battery) that supplies power to the various components. Optionally, the power source 612 may be logically connected to the processor 611 through a power management system to perform functions such as managing charging, discharging, and power consumption management through the power management system.

In addition, the terminal 60 includes functional modules not shown, which will not be elaborated herein.

Optionally, one embodiment of the present disclosure further provides a terminal including a processor 611, a memory 690, and a computer program stored in the memory 690 and executable on the processor 611. When the computer program is executed by the processor 611, each of the processes of the random access method performed by the terminal side of the above embodiment is implemented, and the same technical effect can be achieved. To avoid repetition, details are not described herein.

One embodiment of the present disclosure further provides a computer readable storage medium. The computer readable storage medium stores a computer program. The computer program is executed by a processor to implement various processes of the random access method performed by the terminal side of the above embodiment, and the same technical effect can be achieved. To avoid repetition, details are not described herein. The computer readable storage medium, may be, for example, a read-only memory (Read-Only Memory, ROM), a random access memory (Random Access Memory, RAM), a magnetic disk, or an optical disk.

Figure 7:
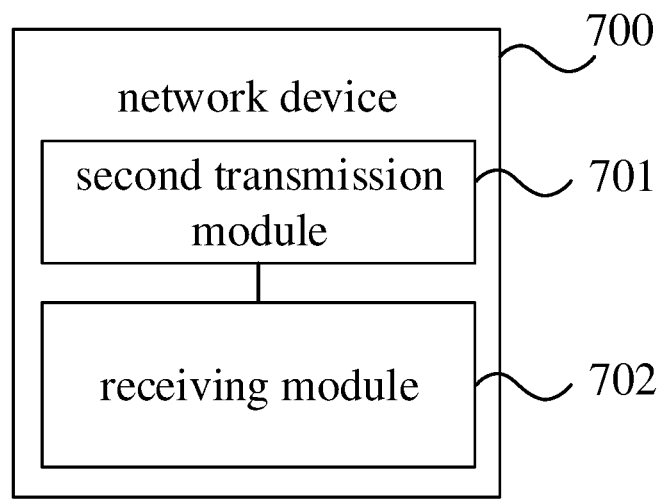
FIG. 7 is a schematic diagram showing modules of a network device according to an embodiment of the present disclosure.

As shown in FIG. 7, one embodiment of the present disclosure further provides a network device 700, including:

a second transmission module 701 configured to transmit configuration information of a target random access to a terminal;

a receiving module 702 configured to receive a message 1 of the target random access fed back by the terminal.

The message 1 is transmitted on a first PUSCH resource which is determined by the terminal for transmitting the message 1 according to the configuration information.

Specifically, the configuration information includes at least one of the following information:
at least one reference signal monitored by the terminal;
association relationship between reference signals and PUSCH resources;
a performance indicator according to which the terminal selects a first reference signal from the at least one reference signal;
a preset threshold value for a performance indicator, according to which the terminal selects a first reference signal from the at least one reference signal.

Specifically, the association relationship includes at least one of the following information:
there is a one-to-one relationship between the reference signal and the PUSCH resource;
one PUSCH resource corresponds to at least one reference signal;
one reference signal corresponds to at least one PUSCH resource.

Specifically, the at least one reference signal includes at least one synchronization signal block (SSB) and/or at least one channel state information reference signal (CSI-RS).

Specifically, the performance indicator includes one of the following information:
Reference signal receiving power (RSRP), reference signal receiving quality (RSRQ), and signal-to-noise ratio (SINR).

Specifically, the PUSCH resource includes: a grant-free resource and/or a pre-configured resource for a target random access.

Further, the second transmission module 701 is configured to perform at least one of the following ways:
transmitting configuration information of a target random access to the terminal through a system broadcast message;
transmitting configuration information of a target random access to the terminal through a radio resource control (RRC) release message.

It should be noted that this network device embodiment is a network device corresponding to the foregoing random access method performed by the network-side device. All implementation modes of the foregoing embodiments are applicable to this network device embodiment, and the same technical effect can also be achieved.

One embodiment of the present disclosure further provides a network device including a memory, a processor, and a computer program stored in the memory and executable on the processor. When the computer program is executed by the processor, each of the processes of the random access method performed by the network-side device side of the above embodiment is implemented, and the same technical effect can be achieved. To avoid repetition, details are not described herein.

One embodiment of the present disclosure further provides a computer readable storage medium. The computer readable storage medium stores a computer program. The computer program is executed by a processor to implement various processes of the random access method performed by the network-side device of the above embodiment, and the same technical effect can be achieved. To avoid repetition, details are not described herein. The computer readable storage medium, may be, for example, a read-only memory (Read-Only Memory, ROM), a random access memory (Random Access Memory, RAM), a magnetic disk, or an optical disk.

Figure 8:
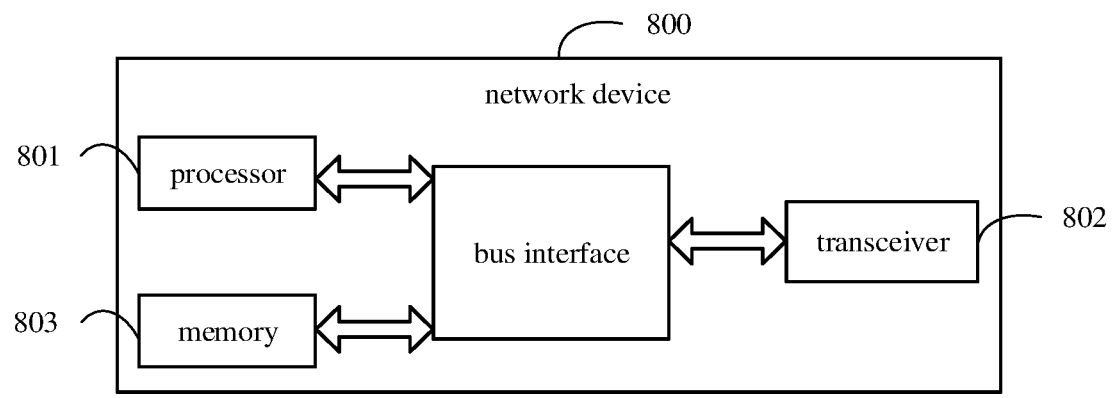
FIG. 8 is a structural block diagram of a network device according to an embodiment of the present disclosure.

FIG. 8 is a structural diagram of a network device according to an embodiment of the present disclosure, which can implement details of the foregoing random access method performed by the network-side device and achieve the same effect. As shown in FIG. 8, the network device 800 includes: a processor 801, a transceiver 802, a memory 803, and a bus interface.

The processor 801 is configured to read programs from the memory 803 and execute the following processes:
transmitting, via the transceiver 802, configuration information of a target random access to a terminal;
receiving a message 1 of the target random access fed back by the terminal.

The message 1 is transmitted on a first PUSCH resource which is determined by the terminal for transmitting the message 1 according to the configuration information.

In FIG. 8, a bus architecture may include any number of interconnected buses and bridges. Specifically, one or more processors demonstrated with processor 801 are coupled with various circuits of memory, which is demonstrated with memory 803. The bus architecture may also link various other circuits, such as, peripherals, voltage regulators, and power management circuits, as is known in the art. Thus, in the application, no further description is provided. The bus interface provides an interface. The transceiver 802 may be composed of multiple components, that is, including a transmitter and a receiver, which provide a unit for communicating with various other devices via the transmitting medium.

The processor 801 is in charge of managing bus architecture and general processing. The memory 803 may store data used when the processor 801 performs operations.

Specifically, the configuration information includes at least one of the following information:
at least one reference signal monitored by the terminal;
association relationship between reference signals and PUSCH resources;
a performance indicator according to which the terminal selects a first reference signal from the at least one reference signal;
a preset threshold value for a performance indicator, according to which the terminal selects a first reference signal from the at least one reference signal.

Specifically, the association relationship includes at least one of the following information:
there is a one-to-one relationship between the reference signal and the PUSCH resource;
one PUSCH resource corresponds to at least one reference signal;
one reference signal corresponds to at least one PUSCH resource.

Specifically, the at least one reference signal includes at least one synchronization signal block (SSB) and/or at least one channel state information reference signal (CSI-RS).

Specifically, the performance indicator includes one of the following information:
Reference signal receiving power (RSRP), reference signal receiving quality (RSRQ), and signal-to-noise ratio (SINR).

Specifically, the PUSCH resource includes: a grant-free resource and/or a pre-configured resource for a target random access.

Optionally, the processor 801 is configured to read programs from the memory 803 and execute at least one of the following ways:
transmitting configuration information of a target random access to the terminal through a system broadcast message;
transmitting configuration information of a target random access to the terminal through a radio resource control (RRC) release message.

The network device may be a Base Transceiver Station (Base Transceiver Station, BTS) in Global System of Mobile communication (Global System of Mobile communication, GSM) or Code Division Multiple Access (Code Division Multiple Access, CDMA), a NodeB (NodeB, NB) in Wideband Code Division Multiple Access (Wideband Code Division Multiple Access, WCDMA), an Evolutional Node B (Evolutional Node B, eNB or eNodeB) in LTE, a relay station, an access point, or a base station in a future 5G network, which is not limited herein.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure. The electronic hardware includes but is not limited to, electronic circuits, specific application integrated circuits, programmable logic devices, programmable processors, etc.

The above are merely optional embodiments of the present disclosure. It should be noted that, a person skilled in the art may make improvements and modifications without departing from the principle of the present disclosure, and these improvements and modifications shall also fall within the scope of the present disclosure.

What is claimed is:

1. A random access method, performed by a terminal, comprising:
obtaining configuration information of a target random access, wherein the target random access is a two-step contention random access, and the configuration information comprises: association relationship between reference signals and PUSCH resources; wherein the reference signals comprise at least one synchronization signal block (SSB);
determining a first physical uplink shared channel (PUSCH) resource for transmitting data in a message 1 of the two-step contention random access, according to the association relationship between reference signals and PUSCH resources in the configuration information;
on the first PUSCH resource, transmitting data in the message 1 of the two-step contention random access;
wherein the determining a first physical uplink shared channel (PUSCH) resource for transmitting a message 1 of the two-step contention random access, according to the association relationship between reference signals and PUSCH resources in the configuration information, comprises:
determining a first reference signal;

determining one PUSCH resource from PUSCH resources associated with the first reference signal, as the first PUSCH resource for transmitting the message 1;

wherein the determining a first reference signal, comprises:

when there is a reference signal with a performance indicator being greater than or equal to a preset threshold value, determining one reference signal from at least one reference signal with the performance indicator being greater than or equal to the preset threshold value, as the first reference signal; or, when there is no reference signal with a performance indicator being greater than or equal to the preset threshold value, determining one reference signal from reference signals configured by a network device for the terminal, as the first reference signal;

wherein the determining one reference signal from at least one reference signal with the performance indicator being greater than or equal to the preset threshold value, as the first reference signal, comprises:

when there are at least two reference signals with performance indicators being greater than or equal to the preset threshold value, determining one of the at least two reference signals with performance indicators being greater than or equal to the preset threshold value, as the first reference signal;

wherein the first reference signal is one randomly selected from the at least two reference signals; or, the first reference signal is one, which meets a first preset condition, from the at least two reference signals.

2. The random access method according to claim 1, wherein the configuration information further comprises at least one of the following information:

at least one reference signal monitored by the terminal;

a performance indicator according to which the terminal selects a first reference signal from the at least one reference signal;

a preset threshold value for a performance indicator, according to which the terminal selects a first reference signal from the at least one reference signal.

3. The random access method according to claim 2, wherein the at least one reference signal comprises at least one synchronization signal block (SSB) and/or at least one channel state information reference signal (CSI-RS).

4. The random access method according to claim 2, wherein the performance indicator comprises one of the following information:

reference signal receiving power (RSRP), reference signal receiving quality (RSRQ), and signal-to-noise ratio (SINR).

5. The random access method according to claim 1, wherein the association relationship comprises at least one of the following information:

there is a one-to-one relationship between the reference signals and the PUSCH resources;

one PUSCH resource corresponds to at least one reference signal;

one reference signal corresponds to at least one PUSCH resource.

6. The random access method according to claim 1, wherein the PUSCH resource comprises: a grant-free resource and/or a pre-configured resource for the target random access.

7. The random access method according to claim 1, wherein the obtaining configuration information of a target random access, comprises at least one of the following ways:

receiving the configuration information of the target random access transmitted by a network device through a system broadcast message;

receiving the configuration information of the target random access transmitted by the network device through a radio resource control (RRC) release message.

8. The random access method according to claim 1, wherein the determining one reference signal from reference signals configured by a network device for the terminal, as the first reference signal, comprises:

randomly selecting one of the reference signals configured by the network device for the terminal, as the first reference signal; or, selecting one, which meets a first preset condition, from the reference signals configured by the network device for the terminal, as the first reference signal.

9. The random access method according to claim 1, wherein the first preset condition comprises at least one of the following conditions:

time domain is less than or equal to a first preset threshold value;

frequency domain is less than or equal to a second preset threshold value.

10. The random access method according to claim 1, wherein the determining one PUSCH resource from PUSCH resources associated with the first reference signal, as the first PUSCH resource for transmitting the message 1, comprises:

when the first reference signal is associated with one PUSCH resource, determining the PUSCH resource corresponding to the first reference signal as the first PUSCH resource; or, when the first reference signal is associated with at least two PUSCH resources, selecting a target PUSCH resource from the at least two PUSCH resources associated with the first reference signal, as the first PUSCH resource.

11. The random access method according to claim 10, wherein the target PUSCH resource is a random one of the at least two PUSCH resources associated with the first reference signal, or, the target PUSCH resource is one PUSCH resource, which meets a second preset condition, of the at least two PUSCH resources associated with the first reference signal.

12. A terminal, comprising: a memory, a processor, and a computer program stored in the memory and executable on the processor; wherein the computer program is executed by the processor to implement steps of:

obtaining configuration information of a target random access, wherein the target random access is a two-step contention random access, and the configuration information comprises: association relationship between reference signals and PUSCH resources; wherein the reference signals comprise at least one synchronization signal block (SSB);

determining a first physical uplink shared channel (PUSCH) resource for transmitting data in a message 1 of the two-step contention random access, according to the association relationship between reference signals and PUSCH resources in the configuration information;

on the first PUSCH resource, transmitting data in the message 1 of the two-step contention random access;

wherein when determining a first physical uplink shared channel (PUSCH) resource for transmitting a message 1 of the two-step contention random access, according to the association relationship between reference signals and PUSCH resources in the configuration information, the computer program is executed by the processor to implement:

determining a first reference signal;

determining one PUSCH resource from PUSCH resources associated with the first reference signal, as the first PUSCH resource for transmitting the message 1;

wherein when determining a first reference signal, the computer program is executed by the processor to implement:

when there is a reference signal with a performance indicator being greater than or equal to a preset threshold value, determining one reference signal from at least one reference signal with the performance indicator being greater than or equal to the preset threshold value, as the first reference signal; or, when there is no reference signal with a performance indicator being greater than or equal to the preset threshold value, determining one reference signal from reference signals configured by a network device for the terminal, as the first reference signal;

wherein when determining one reference signal from at least one reference signal with the performance indicator being greater than or equal to the preset threshold value, as the first reference signal, the computer program is executed by the processor to implement:

when there are at least two reference signals with performance indicators being greater than or equal to the preset threshold value, determining one of the at least two reference signals with performance indicators being greater than or equal to the preset threshold value, as the first reference signal;

wherein the first reference signal is one randomly selected from the at least two reference signals; or, the first reference signal is one, which meets a first preset condition, from the at least two reference signals.

13. The terminal according to claim 12, wherein the configuration information further comprises at least one of the following information:

at least one reference signal monitored by the terminal;

a performance indicator according to which the terminal selects a first reference signal from the at least one reference signal;

a preset threshold value for a performance indicator, according to which the terminal selects a first reference signal from the at least one reference signal.

14. The terminal according to claim 12, wherein the association relationship comprises at least one of the following information:

there is a one-to-one relationship between the reference signals and the PUSCH resources;

one PUSCH resource corresponds to at least one reference signal;

one reference signal corresponds to at least one PUSCH resource.

15. A random access method, performed by a terminal, comprising:

obtaining configuration information of a target random access, wherein the target random access is a two-step contention random access, and the configuration information comprises: association relationship between reference signals and PUSCH resources; wherein the reference signals comprise at least one synchronization signal block (SSB);

determining a first physical uplink shared channel (PUSCH) resource for transmitting data in a message 1 of the two-step contention random access, according to the association relationship between reference signals and PUSCH resources in the configuration information;

on the first PUSCH resource, transmitting data in the message 1 of the two-step contention random access;

wherein the determining a first physical uplink shared channel (PUSCH) resource for transmitting a message 1 of the two-step contention random access, according to the association relationship between reference signals and PUSCH resources in the configuration information, comprises:

determining a first reference signal;

determining one PUSCH resource from PUSCH resources associated with the first reference signal, as the first PUSCH resource for transmitting the message 1;

wherein the determining one PUSCH resource from PUSCH resources associated with the first reference signal, as the first PUSCH resource for transmitting the message 1, comprises:

when the first reference signal is associated with one PUSCH resource, determining the PUSCH resource corresponding to the first reference signal as the first PUSCH resource; or, when the first reference signal is associated with at least two PUSCH resources, selecting a target PUSCH resource from the at least two PUSCH resources associated with the first reference signal, as the first PUSCH resource;

wherein the target PUSCH resource is a random one of the at least two PUSCH resources associated with the first reference signal, or, the target PUSCH resource is one PUSCH resource, which meets a second preset condition, of the at least two PUSCH resources associated with the first reference signal;

wherein the second preset condition comprises: time domain is less than or equal to a third preset threshold value.

* * * * *